United States Patent [19]

Gunawardana

[11] Patent Number: 4,581,721
[45] Date of Patent: Apr. 8, 1986

[54] MEMORY APPARATUS WITH RANDOM AND SEQUENTIAL ADDRESSING

[75] Inventor: Rudjeev R. Gunawardana, Bedford, England

[73] Assignee: Texas Instruments Incorporated, Dallas, Tex.

[21] Appl. No.: 436,484

[22] Filed: Oct. 25, 1982

[30] Foreign Application Priority Data

Nov. 18, 1981 [GB] United Kingdom ............ 81 34762

[51] Int. Cl.$^4$ ............ G11C 8/00; G11C 7/00
[52] U.S. Cl. ............ 365/230; 365/239; 364/200; 364/900
[58] Field of Search ............ 365/230, 239, 236; 364/200 MS File, 900 MS File

[56] References Cited

U.S. PATENT DOCUMENTS

| | | | |
|---|---|---|---|
| 3,798,617 | 3/1974 | Varadi et al. | 365/230 |
| 3,895,360 | 7/1975 | Cricchi et al. | 365/230 |
| 3,962,689 | 6/1976 | Brunson | 365/239 |
| 4,120,048 | 10/1978 | Fuhrman | 365/239 |

FOREIGN PATENT DOCUMENTS

| | | |
|---|---|---|
| 0076082 | 4/1983 | European Pat. Off. . |
| 0132582 | 10/1980 | Japan ............ 365/230 |
| 8103234 | 11/1981 | PCT Int'l Appl. . |
| 1582272 | 1/1981 | United Kingdom . |

*Primary Examiner*—John H. Wolfe
*Assistant Examiner*—Glenn A. Gossage
*Attorney, Agent, or Firm*—Robert D. Marshall, Jr.; N. Rhys Merrett; Melvin Sharp

[57] ABSTRACT

A memory apparatus suitable for storing data for a high resolution bit mapped display includes large capacity (e.g. 64-k) semiconductor random access memory circuits in which to reduce the effective access time the circuits are operated and addressed in a repeating cycle including in succession reading from two or more addresses in sequence having the same row address component (i.e. in page mode), for example for the display, and writing into or reading from a randomly selected address.

7 Claims, 3 Drawing Figures

MEMORY APPARATUS WITH RANDOM AND SEQUENTIAL ADDRESSING

This invention relates to memory apparatus and especially but not exclusively to memory apparatus for storing a bit mapped display wherein the memory has the same number of address locations as there are picture elements in the display.

High resolution video display systems are frequently employed to provide an image output from a computer. The provision of high resolution inevitably involves a relatively large amount of storage capacity in the memory storing the data to be displayed, and if the display is produced on a cathode ray tube screen, it follows the the entire display memory must be able to be read within the period of time between successive descriptions of the display on the cathode ray tube screen. In accordance with conventional broadcast television standards, this period of time is 1/25th or 1/30th of a second. For a typical high resolution display of 512×512 picture elements (pixels), the pixel cycle time is approximately 100 ns. Such a cycle time is well beyond the performance capability of currently commercially available 64-k dynamic random access memory integrated circuits which typically have a read or write cycle time of between 280 and 410 ns. The difficulty could be overcome by using 16-k RAM integrated circuits and operating these in parallel in conjunction with a 16-way multiplexing circuit. Such an arrangement would require a memory cycle time of 1600 ns which would be practicable. However, as 16 circuits would be required for each bit of the picture elements data and for a reasonable range of gradation of the display, even a monochorme display would require four bits for each element calling for a total of 64 circuits and, if color information were to be included as well, possibly 128 or 192 circuits would be needed. Such a large amount of circuitry would require a relatively complex printed circuit board to support it and it would be subject to timing and reliability problems in its manufacture. It is clearly advantageous to use 64-k RAM integrated circuits if possible. Since four 64-k RAM circuits would be needed for each bit of the display data or a 512×512 pixel display, by the use of a 4-way multiplexer a memory cycle time of 400 ns would be available, and whilst it would be possible to read the information from the memory within this period of time, no time would be left for accessing the display memory without interfering with the continuity of the display, and two memory access cycles would have to be available in each 400 ns time interval to provide full random access.

It is an object of the present invention to provide an improved form of memory apparatus in which the above difficulty is overcome.

According to a first aspect of the present invention there is provided memory apparatus having semiconductor random access memory circuits including addressing means, data entry means and data read out means, the memory circuits requiring addresses with first and second parts of which the parts are entered consecutively and including means for storing a representation of at least the first part of an address for use with a plurality of second parts. The apparatus includes a first address circuit for generating addresses of the memory circuits in a predetermined order enabling there to be read therefrom signals corresponding to the stored data in sequence, and a second addressing circuit for generating addresses of the memory circuits in random order to enter data therein or read data therefrom, wherein the memory circuits are operated and addressed in accordance with a repeated cycle containing in succession two or more addresses having the same first part from the first addressing circuit and an address from the second addressing circuit.

According to a second aspect of the present invention there is provided display apparatus including display for displaying an image having a plurality of picture elements, semiconductor random access memory circuits for storing representations of the picture elements to be displayed, and including addressing means, data entry means and data read out means, the memory circuits requiring addresses with first and second parts of which the parts are entered consecutively and including means for storing a representation of at least the first part of an address for use with a plurality of subsequently entered second parts, first addressing circuit for generating addresses of the memory circuits in a predetermined order enabling there to be read therefrom signals corresponding to the pixel representations in sequence and for applying the signals to the display to cause the corresponding display to be produced, and second addressing circuit for generating addresses of the memory circuits in random order to enter pixel representations therein or read representations therefrom, wherein the memory circuits are operated and addressed in accordance with a repeated cycle containing in succession two or more addresses having the same first part and differing second parts from the first addressing circuit and an address in random order from the second addressing circuit.

According to a third aspect of the present invention there is provided a method of providing sequential and random access to a semiconductor random access memory requiring addresses with first and second parts which are entered consecutively in which the memory is operated in accordance with a repeated cycle containing in succession a random access operation for a single address and a sequential access operation for two or more addresses in sequential order having the same first part and different second parts wherein the first part is retained by the memory whilst the differing second parts completing the two or more addresses are applied to it.

The cycle may contain in succession two addresses having the same first part from the first means and one address from the second means. The memory circuits may be 65,536-bit random access memory integrated circuits, so-called 64-k bit DRAM chips. (65,536=64×1024; 1024=$2^{10}$ and is approximately 1000, i.e. 1 k). One example of such an integrated circuit is the TMS 4164 manufactured by Texas Instruments.

In one example the display has 512 horizontal rows and 512 vertical columns giving 262,144 pixels. The necessary storage capacity to provide one bit per pixel would be available from four 64-k bit RAM chips. For a monochromatic picture display, typically 16 levels of brightness would be required and to provide the storage capacity for such a display 16 64-k bit RAM chips would be needed. Additional memory capacity could accommodate color information, either by providing separate memories for the primary color components at each pixel instead of one for monochrome brightness, or by providing a memory for the hue and saturation at each pixel in addition to the monochrome brightness information.

The display apparatus may be associated with a computer for providing the pixel representations. The computer may make use of the random access to the displayed memory to perform computations based on the display data as well as update the stored data.

In order that the invention may be fully understood and readily carried into effect it will now be described with reference to the accompanying drawings, of which:

Figure 1:
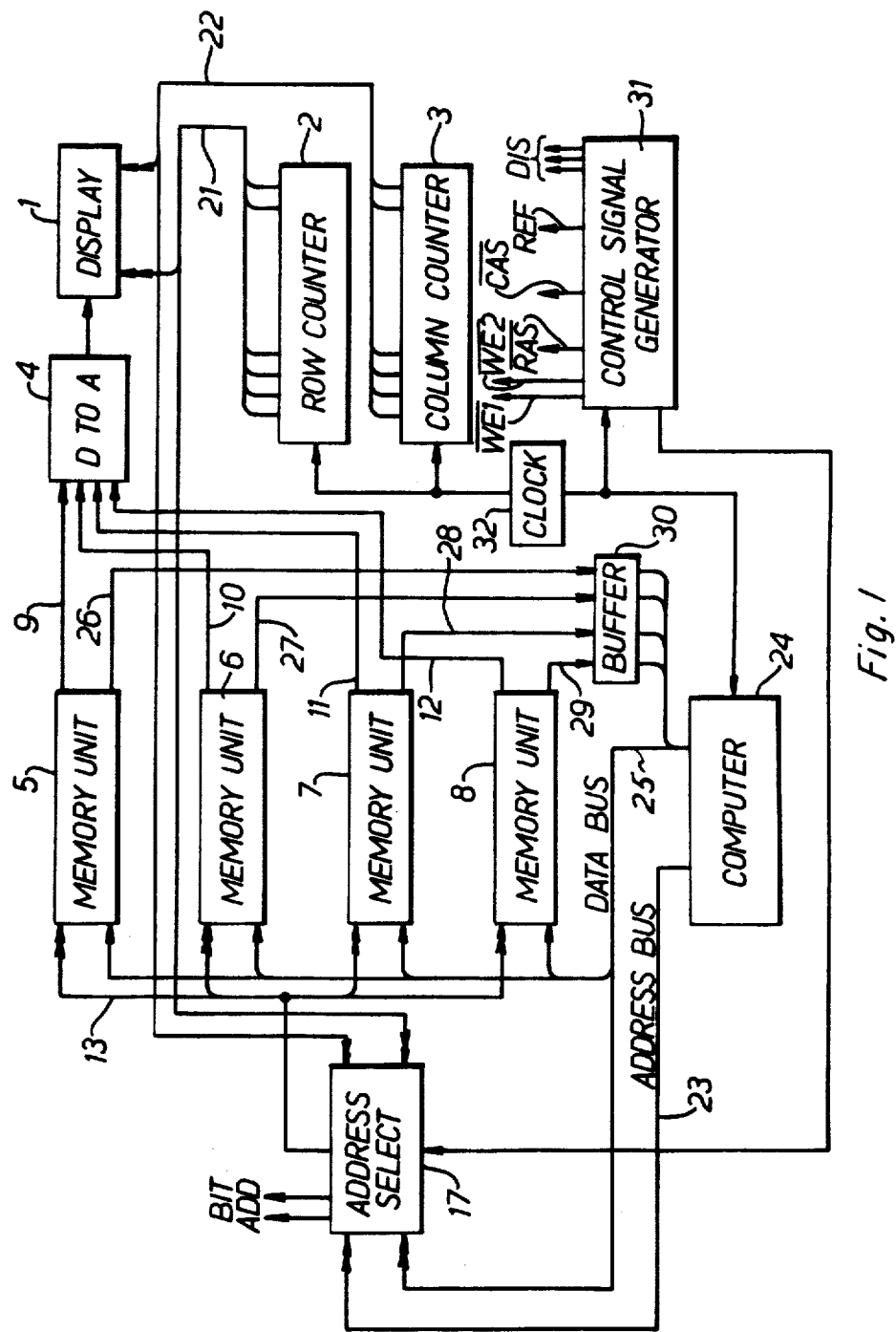
FIG. 1 shows in block diagrammatic form a computer system containing apparatus in accordance with one example of the present invention.

In FIG. 1, single conductors are marked by single arrows and multiple conductors by double arrows. Referring to FIG. 1, the display apparatus includes a display 1, which may, for example, include a cathode ray tube with its associated drive and scanning circuits. The scanning circuits of the display 1 receive horizontal scanning information from a row counter 2 and vertical scanning information from a column counter 3. The video information for controlling the brightness of the individual pixels of the display contains 16 levels of brightness and is provided by a 4-bit digital to analog converter 4. If the display 1 is capable of producing a color display, then the color information may be provided either by individual signals representing the primary color components at the pixels, or by a separate signal representing the hue and saturation at the pixels, from a circuit arrangement similar to that to be described which provides the brightness information.

Four memory units 5, 6, 7 and 8 provide the 4-bit parallel input to the converter 4 via conductors 9, 10, 11 and 12 at the necessary repetitive rate required to generate the display. Typically, the memory units 5, 6, 7 and 8 will maintain each output for a period of 400 ns during which time the converter 4 will produce the corresponding analog output voltage and apply it to the display means 1. The memory units 5, 6, 7 and 8 receive address information via a common 8-bit address bus 13 and BIT ADD conductors from an address select circuit 17. The manner in which the memory units make use of the 8-bit addresses will be explained in greater detail with reference to FIG. 2. The memory units have two modes of operation which are interlaced in a repeated cycle. In the first mode of operation, the addresses of the memory are accessed in serial order and the data read from the memories is applied via the conductors 9, 10, 11 and 12 to the converter 4. The address information for this serial addressing is obtained from the row counters 2 and 3 via 9-bit buses 21 and 22. In the second mode of operation of the memory units 5, 6, 7 and 8, the memory locations are randomly accessible and the address information for the memories is obtained from a 16-bit address bus 23 and an 8-bit data bus 25 of a computer 24. The address selector transmits the addresses either from the buses 21 and 22 or from the buses 23 and 25 to the bus 13, so that the correct address for the particular mode of operation is applied to the memory units 5, 6, 7 and 8. Data to be entered into the randomly accessed memory locations is generated by the computer 24 and transmitted to the memory units 5, 6, 7 and 8 via the data bus 25. Bit addressing data BIT ADD is also transmitted via the data bus 25 and the address selector 17 to select the chip within the memory unit 5, 6, 7 or 8. Data read from the memory units 5, 6, 7 and 8 in the form of single bits from each unit are transferred via conductors 26, 27, 28 and 29 to a 4-bit buffer 30 which is connected to the data bus 25.

The operation of the memory units 5, 6, 7 and 8 is controlled by a number of control signals generated by a control signal generator 31. The manner in which these control signals are connected to the memory units 5, 6, 7 and 8 will be described in greater detail with reference to FIG. 2. The generator 31 also provides a control signal for the address selector 17 to cause it to transmit the correct addresses to the memory units 5, 6, 7 and 8 at the correct times for the cycle of modes of operation. A clock 32 provides clock signals for driving the row counter 2, the column counter 3, the computer 24 and the control signal generator 31.

Figure 2:
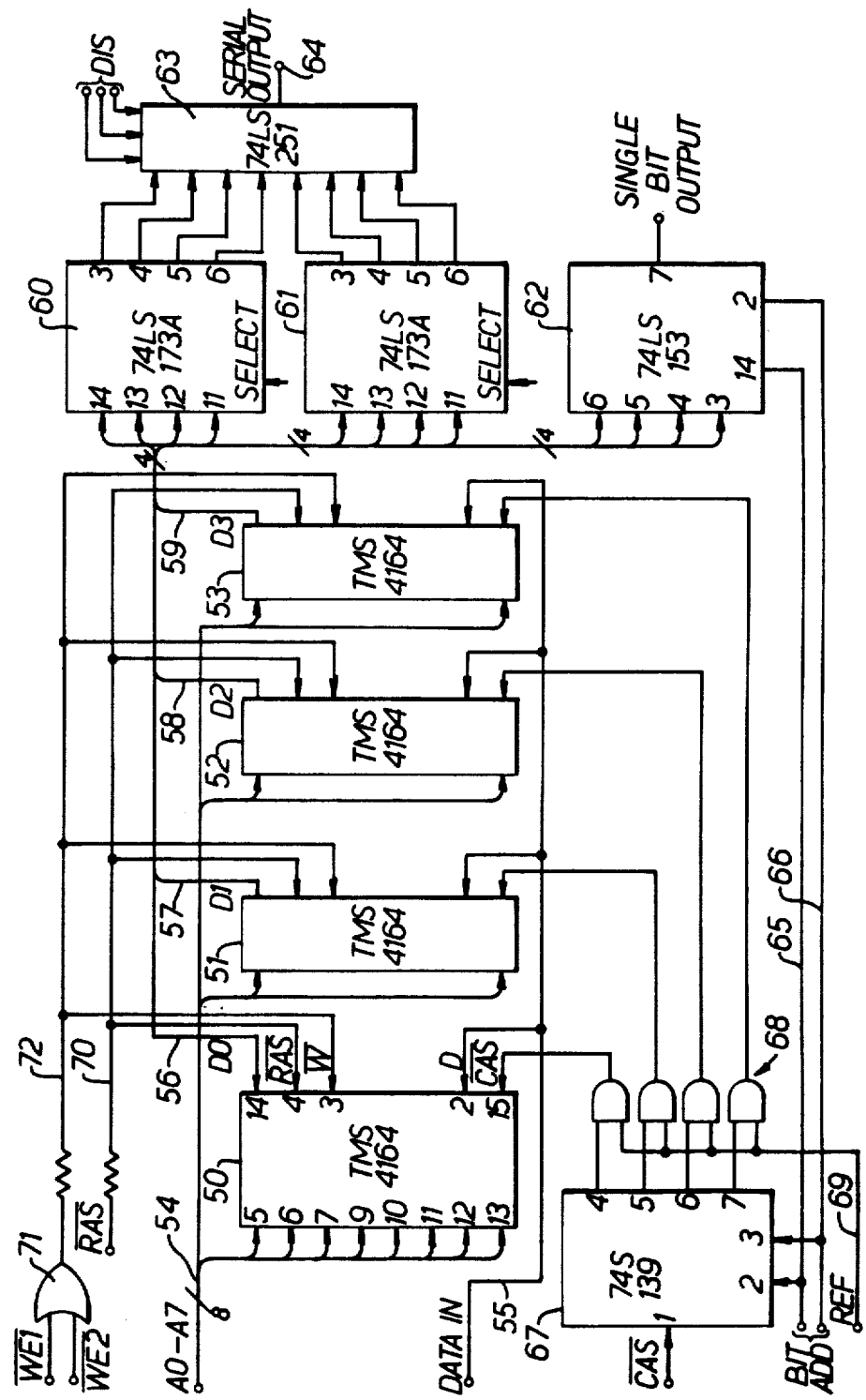
FIG. 2 shows in detail the circuit of a memory unit of the display apparatus shown in FIG. 1.

Referring now to FIG. 2, this shows the circuit arrangement of each of the memory units 5, 6, 7 and 8. The 64-k RAM integrated circuit is shown as being of type TMS 4164 manufactured by Texas Instruments, and details of the power supplies and timing of control signals are shown in the data sheet published by Texax Instruments for this circuit. The type numbers of other integrated circuits are also shown in FIG. 2, all these are TTL logic circuits and are available from Texas Instruments. The details of power supplies and relative timing of these circuits are published in the data sheets for the particular circuits. It will be appreciated that integrated circuits from other manufacturers and of other types may be used as alternatives to those shown in the example illustrated in FIG. 2.

In FIG. 2, the memory circuits are 64 k dynamic random access memory integrated circuits. There are four of these, 50, 51, 52 and 53, and their address inputs are connected in parallel to an 8-bit bus 54. A common line 55 is provided for the data input to the circuits 50, 51, 52 and 53. The output digits from the circuit are fed over respective conductors 56, 57, 58 and 59 to output buffer stores 60 and 61 in parallel. They are also applied to a 4-way multiplexer 62. Signals representing the data stored in the buffer store 60 and 61 are applied to an 8-way multiplexer 63 from which a serial output appears at a terminal 64. The operation of the multiplexer 63 is controlled by three signals DIS from the control signal generator 31 (FIG. 1). The multiplexer 62 is controlled by bit address signals (BIT ADD) fed over conductors 65 and 66 from the computer 24 (FIG. 1). These two bits complete the individual bit addressing of the data stored in the circuits 50, 51, 52 and 53. The bit address digits are also applied to a 4-bit demultiplexer 67. The demultiplexer 67 serves to apply a control signal $\overline{CAS}$ via AND-gates 68 to the $\overline{CAS}$ inputs of the circuits 50, 51, 52 and 53. A refresh control signal REF applied via a conductor 69 forms the second input to the gates 68. Another control signal $\overline{RAS}$ supplied via a conductor 70 to the $\overline{RAS}$ inputs of the circuits 50, 51, 52 and 53. Either of two write enable signals $\overline{WE1}$ or $\overline{WE2}$ are applied to the W inputs of the circuits 50, 51, 52 and 53 via an OR-gate 71 and a conductor 72.

In order to understand fully the operation of the circuits 50, 51, 52 and 53, reference should be made to the data sheet relating to the TMS 4164, or to the data sheet for other such circuits where they are used, for an explanation of the effects of the control signals. In order to address the individual elements of the circuits 50 to 53, it will be appreciated that 16 address bits are required, although only 8 address inputs are provided on the circuits. This is achieved by feeding the address data in two parts. First 8-row address bits are set up on the bus 54 and are stored in the circuits in response to the row address strobe ($\overline{RAS}$) signal. Then the 8-column address bits are set up on the bus 54 and are stored in response to the column address strobe ($\overline{CAS}$) signal. The signal $\overline{RAS}$ also acts as a chip enable signal and it activates the sense amplifiers as well as the row decoder. The signal $\overline{CAS}$ is used as a chip select signal activating the column decoder and the input and output buffers. The read or write mode of the circuits is selected by the operation of the write enable $\overline{W}$ signal. A logic high on the $\overline{W}$ conductor selects the read mode and a logic low selects the write mode. Writing is performed in response to data on conductor 55 and the output data produced in response to a read operation appears on the conductors 56, 57, 58 and 59. The circuits are dynamic RAM circuits and therefore require refreshing. In the particular circuits referred to, a refresh procedure must be performed at least every 4 ms and during refreshing the signal $\overline{RAS}$ is applied to the circuits without the signal $\overline{CAS}$, and each of the 256 row addresses is strobed at least once within the 4 ms period. In order that this shall not interfere with the display or the random access, this refreshing is performed by circuits not shown during the line fly-back periods of the display.

Figure 3:
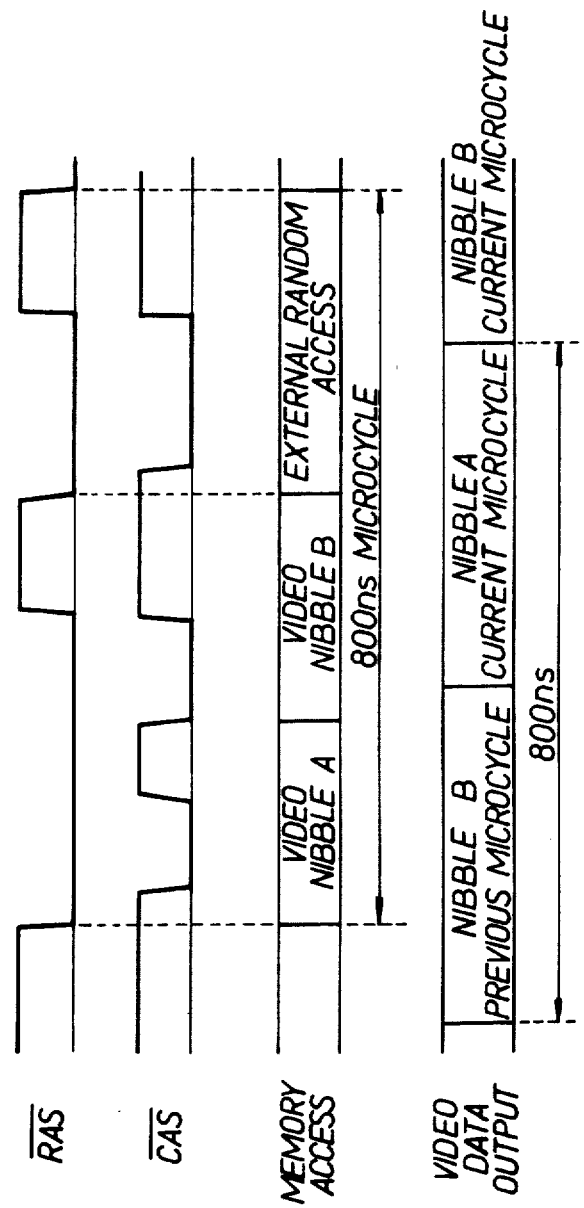
FIG. 3 is a timing diagram illustrating the operation of a memory unit.

The invention makes use of what is referred to as page mode operation of the circuits 50, 51, 52 and 53, during which a single row address is used in conjunction with a plurality of column addresses. Page mode operation allows a memory access (for data read or write) to be carried out with a cycle time of between 160 to 275 ns. In a particular example, two column addresses are used in conjunction with a single row address in the sequential reading of the contents of the memory circuits. In order to achieve this, a row address forming the first part of the address is set up on the bus 54 and the signal $\overline{RAS}$ is applied to the conductor 70. Whilst the signal $\overline{RAS}$ is maintained on the conductor 70, the signal $\overline{CAS}$ is applied twice to all four circuits simultaneously with the establishment of the two column addresses in succession on the bus 54. During this time the signal $\overline{W}$ is high, so that the data is read from the circuits and the two sets of four digits are stored in the buffers 60 and 61 respectively under the control of chip select signals derived from the signal $\overline{CAS}$ by a binary divider. The timing of the signals and the generation of the two 4-bit "nibbles" is shown in FIG. 3. Because of the operation of the memory circuits in page mode, the two 4-bit "nibbles" can be read in about 500 ns which, in accordance with the timing discussed earlier, leaves a period of 300 ns to complete the 800 ns available for 8 pixels. During this 300 ns period, a conventional external random access cycle can be performed by the computer 24, so that individual storage elements in the memory circuits can be addressed for both reading and writing. Thus the computer 24 can utilize the memory circuits for data storage on the buses of random access with an access time of 800 ns.

As shown in FIG. 3, the four bits stored in the buffers 60 and 61 are multiplexed to form the serial output at a terminal 64, the timing being so arranged that the bits stored in the buffer 60 are being multiplexed whilst the buffer 61 is being updated and then the bits in the buffer 61 are multiplexed whilst buffer 60 is being updated.

It will be appreciated that although the invention has been described with reference to only one embodiment, many other designs of apparatus embodying the invention may be produced. For example, display means capable of displaying more or less than 512 × 512 elements may be used and consequently larger or small numbers of memory elements provided. Integrated circuits having a larger number of memory elements than "64-k" may be used. More or fewer than four bits of data may be allocated to each picture element. The display means itself need not be a cathode ray tube but could be of any other suitable type, for example, a matrix of electroluminescent or electro-optical elements.

The technique for obtaining both sequential and random access to the storage elements of a large capacity semiconductor random access memory which is described above may also be used where no display is to be produced immediately from the data, for example, in high speed data transmission or in digital image processing.

Although a computer is used in the described embodiment to effect random access to the memory any other sutiable device could be used. Moreover, since random access means access in any order, it will be clear that it includes as a special case sequential access in such a case the computer could be replaced by a television camera or other image pick-up device.

What we claim is:

1. Memory apparatus having semiconductor randon access memory circuits including addressing means, data entry means and data readout means, the memory circuits having a smaller number of address terminals than the number of bits necessary to specify the address requiring addresses with successively entered first and second parts and including means for storing a representation of at least the first part of an address for use with a plurality of second parts, first addressing means for generating a sequences of a predetermined number of two or more addresses of the memory circuits in a predetermined order enabling there to be read therefrom signals, said sequence of addresses having a single first part and differing second parts, and second addressing means for generating addresses of the memory circuits in random order to enter data therein or read data therefrom, wherein the memory circuits are operated and addressed in accordance with a repeated cycle containing in succession said predetermined number of two or more addresses having the same first part and said differing second parts from said first addressing means and an address from the second addressing means.

2. Apparatus according to claim 1, wherein the repeated cycle contains in succession two addresses having the same first part from the first addressing means and a single address from the second addressing means.

3. A memory apparatus as claimed in claim 1 wherein:
said first addressing means generates said sequences of addresses having second parts in consecutive numerical sequence.

4. A method of providing sequential and random access to a semiconductor random access memory requiring addresses with first and second parts which are entered consecutively in which the memory is operated in accordance with a repeated cycle containing in succession a random access operation for a single address and a sequential access operation for two or more addresses in sequential order having the same first part wherein the first part is retained by the memory while the second parts completing the two or more addresses are applied to it.

5. A memory apparatus comprising:

semiconductor random access memory circuits including data input means, data output means and address input means, the address input means having a smaller number of address terminals than the number of bits necessary to specify the address requiring addresses with successively entered row and column parts and including means for storing a representation of at least the row part of an address for use with a plurality of column parts, row strobe input means for receiving a row address strobe signal indicating a valid row part of an address and column strobe input means for receiving a column address strobe signal indicating a valid column part of an address;

first addressing means for generating a sequences of a predetermined number of addresses of the memory circuits in a predetermined order having a single row part and a plurality of differing column parts;

second addressing means for generating addresses of the memory circuits including row parts and column parts in random order;

address selection means connected to said memory circuits, and said first and second addressing means for applying one of said row parts or column parts of said addresses received from said first and second addressing means; and sequence control means connected to said row strobe input means and said column strobe input means of said memory circuits and to said address selection means for operating with a repeated cycle including (a) causing said address selection means to connect the row part of said first address of said sequence of addresses of said first addressing means to said memory circuits while simultaneously applying said row address strobe signal to said row strobe input means of said memory circuits, (b) causing said address selection means to connect successive column parts of said sequence of addresses of said first addressing means to said memory circuits while simultaneously applying said column address strobe signal to said column strobe input means of said memory circuits, (c) causing said address selection means to connect the row part of said address of said second addressing means to said memory circuits while simultaneously applying said row address strobe signal to said row strobe input means of said memory circuits, and (d) causing said address selection means to connect said column part of said address of said second addressing means to said memory circuits while simultaneously applying said column address strobe signal to said column strobe input means of said memory circuits.

6. A memory apparatus as claimed in claim 5 wherein:

said sequence of addresses of said first addressing means includes two addresses having a single row part and two differing column parts;

said sequence of said sequence control means includes causing said address selection means to connect two successive column parts of said sequence of addresses of said first addressing means to said memory circuits while simultaneously applying said column address strobe signal to said column strobe input means of said memory circuit.

7. The memory apparatus as claimed in claim 5 wherein:

said first addressing means generates said sequences of addresses having second address parts in consecutive numerical sequence.

* * * * *

REEXAMINATION CERTIFICATE (3533rd)

United States Patent [19]

Gunawardana

[11] B1 4,581,721

[45] Certificate Issued Jun. 9, 1998

[54] MEMORY APPARATUS WITH RANDOM AND SEQUENTIAL ADDRESSING

[75] Inventor: Rudjeev R. Gunawardana, Bedford, England

[73] Assignee: Texas Instruments Incorporated, Dallas, Tex.

Reexamination Request:
No. 90/004.716, Aug. 7, 1997

Reexamination Certificate for:
Patent No.: 4,581,721
Issued: Apr. 8, 1986
Appl. No.: 436,484
Filed: Oct. 25, 1982

[30] Foreign Application Priority Data

Nov. 18, 1981 [GB] United Kingdom .................. 81 34762

[51] Int. Cl.$^6$ ...................................................... G11C 8/00
[52] U.S. Cl. ........................................... 365/230; 365/239

[58] Field of Search ..................................... 365/230, 239, 365/236

[56] References Cited

U.S. PATENT DOCUMENTS

| | | | |
|---|---|---|---|
| 4,281,401 | 7/1981 | Redwine et al. | 365/222 |
| 4,330,852 | 5/1982 | Redwine et al. | 365/221 |
| 4,394,753 | 7/1983 | Penzel | 365/236 |
| 4,429,375 | 1/1984 | Kobayashi et al. | 365/240 |

*Primary Examiner*—A. Zarabian

[57] ABSTRACT

A memory apparatus suitable for storing data for a high resolution bit mapped display includes large capacity (e.g. 64-k) semiconductor random access memory circuits in which to reduce the effective access time the circuits are operated and addressed in a repeating cycle including in succession reading from two or more addresses in sequence having the same row address component (i.e. in page mode), for example for the display, and writing into or reading from a randomly selected address.

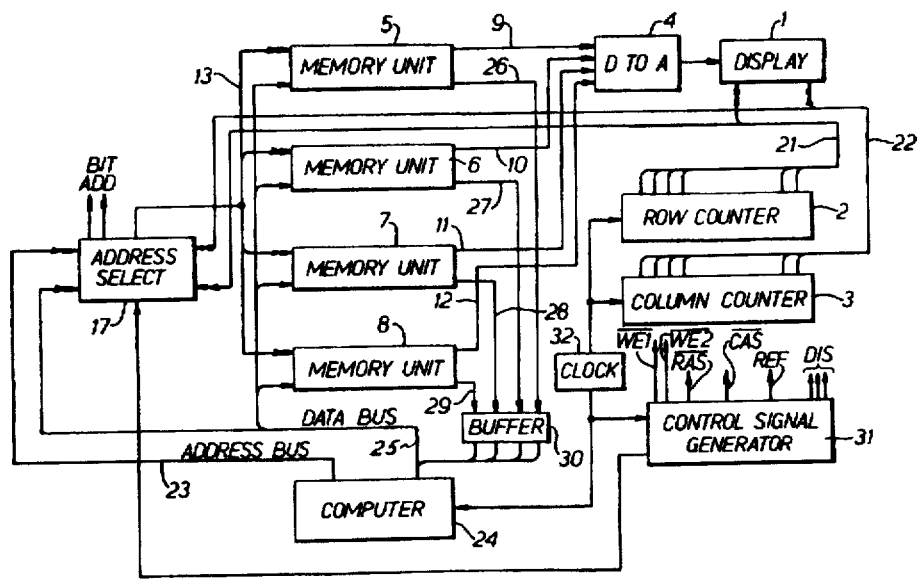

B1 4,581,721

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, line 35–column 4, line 4:

Four memory units 5, 6, 7 and 8 provide the 4-bit parallel input to the converter 4 via conductors 9, 10, 11 and 12 at the necessary repetitive rate required to generate the display. Typically, the memory units 5, 6, 7 and 8 will maintain each output for a period of 400 ns during which time the converter 4 will produce the corresponding analog output voltage and apply it to the display means 1. The memory units 5, 6, 7 and 8 receive address information via a common 8-bit address bus 13 and BIT ADD conductors from an address select circuit 17. The manner in which the memory units make use of the 8-bit addresses will be explained in greater detail with reference to FIG. 2. The memory units have two modes of operation which are interlaced in a repeated cycle. In the first mode of operation, the addresses of the memory are accessed in serial order and the data read from the memories is applied via the conductors 9, 10, 11 and 12 to the converter 4. The address information for this serial addressing is obtained from the row [counters 2 and] *counter 2 and column counter 3* via 9-bit buses 21 and 22. In the second mode of operation of the memory units 5, 6, 7 and 8, the memory locations are randomly accessible and the address information for the memories is obtained from a 16-bit address bus 23 and an 8-bit data bus 25 of a computer 24. The address selector transmits the addresses either from the buses 21 and 22 or from the buses 23 and 25 to the bus 13, so that the correct address for the particular mode of operation is applied to the memory units 5, 6, 7 and 8. Data to be entered into the randomly accessed memory locations is generated by the computer 24 and transmitted to the memory units 5, 6, 7 and 8 via the data bus 25. Bit addressing data BIT ADD is also transmitted via the data bus 25 and the address selector 17 to select the chip within the memory unit 5, 6, 7 or 8. Data read from the memory units 5, 6, 7 and 8 in the form of single bits from each unit are transferred via conductors 26, 27, 28 and 29 to a 4-bit buffer 30 which is connected to the data bus 25.

Column 4, line 60–column 5, line 26:

In order to understand fully the operation of the circuits 50, 51, 52 and 53, reference should be made to the data sheet relating to the TMS 4164, or to the data sheet for other such circuits where they are used, for an explanation of the [effexts] *effects* of the control signals. In order to address the individual elements of the circuits 50 to 53, it will be appreciated that 16 address bits are required, although only 8 address inputs are provided on the circuits. This is achieved by feeding the address data in two parts. First 8-row address bits are set up on the bus 54 and are stored in the circuits in response to the row address strobe ($\overline{RAS}$) signal. Then the 8-column address bits are set up on the bus 54 and are stored in response to the column address strobe ($\overline{CAS}$) signal. The signal $\overline{RAS}$ also acts as a chip enable signal and it activates the sense amplifiers as well as the row decoder. The signal $\overline{CAS}$ is used as a chip select signal activating the column decoder and the input and output buffers. The read or write mode of the circuits is selected by the operation of the write enable $\overline{W}$ signal. A logic high on the $\overline{W}$ conductor selects the read mode and a logic low selects the write mode. Writing is performed in response to data on conductor 55 and the output data produced in response to a read operation appears on the conductors 56, 57, 58 and 59. The circuits are dynamic RAM circuits and therefore require refreshing. In the particular circuits referred to, a refresh procedure must be performed at least every 4 ms and during refresing the signal $\overline{RAS}$ is applied to the circuits without the signal $\overline{CAS}$, and each of the 256 row addresses is strobed at least once within the 4 ms period. In order that this shall not interfere with the display or the random access, this refreshing is performed by circuits not shown during the line fly-back periods of the display.

AS A RESULT OF REEXAMINATION, IT HAS BEEN DETERMINED THAT:

Claims 1, 4 and 5 are determined to be patentable as amended.

Claims 2, 3, 6 and 7, dependent on an amended claim, are determined to be patentable.

New claims 8–20 are added and determined to be patentable.

1. Memory apparatus *coupled to receive a clock signal, the memory apparatus* having semiconductor randon access memory circuits including addressing means, data entry means and data readout means, the memory circuits having a smaller number of address terminals than the number of bits necessary to specify the address requiring addresses with successively entered first and second parts and including means for storing a representation of at least the first part of an address for use with a plurality of second parts, first addressing means for generating a [sequences] *sequence* of a predetermined number of two or more addresses of the memory circuits in a predetermined order *in response to the clock signal* enabling there to be read therefrom signals, said sequence of addresses having a single first part and differing second parts, and second addressing means for generating addresses of the memory circuits in random order to enter data therein or read data therefrom, wherein the memory circuits are operated and addressed in accordance with a repeated cycle containing in succession said predetermined number of two or more addresses having the same first part and said differing second parts from said first addressing means and an address from the second addressing means.

4. A method of providing sequential and random access to a semiconductor random access memory requiring addresses with first and second parts which are entered consecutively *in response to respective control signals and a clock signal* in which the memory is operated in accordance with a repeated cycle containing in successsion a random access operation for a single address and a sequential access operation for two or more addresses in sequential order having the same first part wherein the first part is retained by the memory while the second parts completing the two or more addresses are applied to [it] *the memory in response to the clock signal.*

5. A memory apparatus comprising:

a control circuit coupled to receive a clock signal for generating at least one control signal;

semiconductor random access memory circuits responsive to the at least one control signal including data input means, data output means and address input means, the address input means having a smaller number of address terminals than the number of bits necessary to specify the address requiring addresses with successively entered row and column parts and including means for storing a representation of at least the row part of an address for use with a plurality of column parts, row strobe input means for receiving a row address strobe signal indicating a valid row part of an address and column strobe input means for receiving a column address strobe signal indicating a valid column part of an address;

first addressing means for generating a [sequences] sequence of a predetermined number of addresses of the memory circuits in a predetermined order *in response to the clock signal*, the addresses having a single row part and a plurality of differing column parts;

second addressing means for generating addresses of the memory circuits including row parts and column parts in random order;

address selection means connected to said memory circuits, and said first and second addressing means for applying one of said row parts or column parts of said addresses received from said first and second addressing means; and sequence control means connected to said row strobe input means and said column strobe input means of said memory circuits and to said address selection means for operating with a repeated cycle including (a) causing said address selection means to connect the row part of said first address of said sequence of addresses of said first addressing means to said memory circuits while simultaneously applying said row address strobe signal to said row strobe input means of said memory circuits, (b) causing said address selection means to connect successive column parts of said sequence of addresses of said first addressing means to said memory circuits while simultaneously applying said column address strobe signal to said column strobe input means of said memory circuits, (c) causing said address selection means to connect the row part of said address of said second addressing means to said memory circuits while simultaneously applying said row address strobe signal to said row strobe input means of said memory circuits, and (d) causing said address selection means to connect said column part of said address of said second addressing means to said memory circuits while simultaneously applying said column address strobe signal to said column strobe input means of said memory circuits.

8. A method as in claim 4, further including the step of activating a plurality of sense amplifiers in response to the respective control signal corresponding to the first part of the address, wherein the respective control signal corresponding to the first part of the address is a row address control signal.

9. A method as in claim 4, further including the step of activating an output buffer in response to the respective control signal corresponding to the second part of the address, wherein the respective control signal corresponding to the second part of the address is a column address control signal.

10. A method as in claim 4, further including the step of activating a counter in response to the clock signal for producing the two or more addresses in sequential order.

11. A semiconductor random access memory providing sequential and random access, comprising:

an addressing circuit coupled to receive first and second parts of an address consecutively for producing a random access operation for a single address, the addressing circuit receiving the first part of the address in response to a first control signal and a clock signal, the addressing circuit receiving the second part of the address in response to a second control signal and the clock signal; and a counter circuit for operating the memory in accordance with a repeated cycle in response to the clock signal, the repeated cycle containing in succession the random access operation and a sequential access operation for two or more addresses in sequential order having the same first part, wherein the first part is retained by the memory while the second parts completing the two or more addresses are applied to the memory.

12. A semiconductor random access memory as in claim 11, wherein the first control signal is a row address control signal and the second control signal is a column control signal.

13. A semiconductor random access memory as in claim 12, wherein the counter circuit produces a sequence of column addresses in response to the clock signal.

14. A semiconductor random access memory as in claim 13, further comprising a plurality of sense amplifiers, wherein the sense amplifiers are activated in response to the row address control signal.

15. A semiconductor random access memory as in claim 14, further comprising an output buffer, wherein the output buffer is activated in response to the column address control signal.

16. A semiconductor random access memory as in claim 15, further comprising:

a plurality of memory circuits, wherein the second part of the address comprises a first group of address bits and a second group of address bits, the first group of address bits accessing a respective datum from each memory circuit, the second group of address bits selecting one of the respective datum from the plurality of memory circuits; and an output circuit coupled to receive the respective datum from the plurality of memory circuits, the output circuit producing the respective datum at a data terminal.

17. A computer system, comprising:

a clock circuit for generating a clock signal;

a control circuit coupled to receive the clock signal for producing a row address control signal and a column address control signal;

a semiconductor random access memory providing sequential and random access, including:

an addressing circuit coupled to receive first and second parts of an address consecutively for producing a random access operation for a single address, the addressing circuit receiving the first part of the address in response to the row address control signal and the clock signal, the addressing circuit receiving the second part of the address in response to the column address control signal and the clock signal; and a counter circuit for operating the memory in accordance with a repeated cycle in response to the clock signal, the repeated cycle containing in succession the random access operation and a sequential access operation for two or more addresses in sequential order having the same first part, wherein the first part is retained by the memory while the second parts completing the two or more addresses are applied to the memory.

18. A computer system as in claim 17, further comprising a computer, wherein the computer is responsive to the clock signal.

19. A computer system as in claim 18, wherein the computer is coupled to the semiconductor random access memory by an address bus, the computer producing addresses on the address bus in response to the clock signal.

20. A computer system as in claim 19, wherein the semiconductor random access memory includes a plurality of semiconductor random access memory circuits, the computer selectively applying a separate column address control signal to each of the plurality of semiconductor random access memory circuits.

* * * * *